United States Patent
Barcala et al.

(10) Patent No.: US 10,140,834 B2
(45) Date of Patent: Nov. 27, 2018

(54) MOBILE TRANSCEIVER HAVING ASSET-BASED ALARM PROFILE AND A METHOD OF OPERATION

(71) Applicant: BlackBerry Limited, Waterloo (CA)

(72) Inventors: Sergio Barcala, Coconut Creek, FL (US); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/230,820

(22) Filed: Aug. 8, 2016

(65) Prior Publication Data

US 2018/0040224 A1    Feb. 8, 2018

(51) Int. Cl.
| | | |
|---|---|---|
| G08B 1/08 | (2006.01) | |
| G08B 21/18 | (2006.01) | |
| G06F 1/32 | (2006.01) | |
| G08B 25/10 | (2006.01) | |
| G06Q 10/08 | (2012.01) | |

(52) U.S. Cl.
CPC ............ *G08B 21/18* (2013.01); *G06F 1/3209* (2013.01); *G06Q 10/0833* (2013.01); *G08B 25/10* (2013.01)

(58) Field of Classification Search
CPC ........ G08B 21/18; G08B 25/10; G06F 1/3209
USPC ..................................................... 340/539.13
See application file for complete search history.

(56) References Cited

U.S. PATENT DOCUMENTS

| | | | |
|---|---|---|---|
| 6,982,656 B1 | 1/2006 | Coppinger et al. | |
| 2005/0248454 A1* | 11/2005 | Hanson ................ | G06Q 10/087 340/539.26 |
| 2006/0187026 A1 | 8/2006 | Kochis | |
| 2009/0124304 A1 | 5/2009 | Twitchell | |
| 2012/0143397 A1* | 6/2012 | Mackay .............. | B60R 25/1025 701/1 |
| 2016/0205500 A1* | 7/2016 | Lee ........................ | H04W 4/02 455/456.4 |

OTHER PUBLICATIONS

Invitation to pay additional fees and, where applicable, protest fees; PCT/US2017/045328; Nov. 24, 2017.
Notification of Transmittal of the International Search Report and Written Opinion of the International Searching Authority, or the Declaration; PCT/US2017/045328; dated Jan. 31, 2018.

* cited by examiner

*Primary Examiner* — Tanmay Shah
(74) *Attorney, Agent, or Firm* — Ridout and Maybee LLP

(57) ABSTRACT

A mobile transceiver having an asset-based alarm profile and a method of operation are provided. In accordance with one embodiment, there is provided a method of operating a mobile transceiver: sending to an asset tracking service a message including a device identifier (ID); receiving from the asset tracking service an alarm profile assigned to the device ID, wherein the alarm profile defines a plurality of alarms, each alarm including a trigger condition and one or more actions; storing the alarm profile in a memory of the mobile transceiver; and applying the alarm profile.

24 Claims, 10 Drawing Sheets

MOBILE TRANSCEIVER HAVING ASSET-BASED ALARM PROFILE AND A METHOD OF OPERATION

TECHNICAL FIELD

The present disclosure relates generally to mobile transceivers, and more specifically, to a mobile transceiver having an asset-based alarm profile and a method of operation.

BACKGROUND

Global Navigation Satellite System (GNSS) tracking devices, such as Global positioning system (GPS) tracking devices, are devices carried by objects or persons (carriers) which measure the location of the carrier using the GNSS at regular intervals and typically store the location in internal memory. There are three main types of GNSS tracking devices: a data logger, a data pusher and a data puller. A data logger stores the measured location data in internal memory for subsequent download and analysis. A data pusher (also known as a beacon) sends location data stored in internal memory to a server or other device in accordance with predefined parameters. A data puller (also known as a transponder) stores location data in internal memory and provides the location data in response to queries from a server or other device.

GNSS tracking devices typically have limited power and/or limited processing resources. Accordingly, methods of efficiently operating and deploying GNSS tracking devices are desirable.

DESCRIPTION OF EXAMPLE EMBODIMENTS

Figure 1:
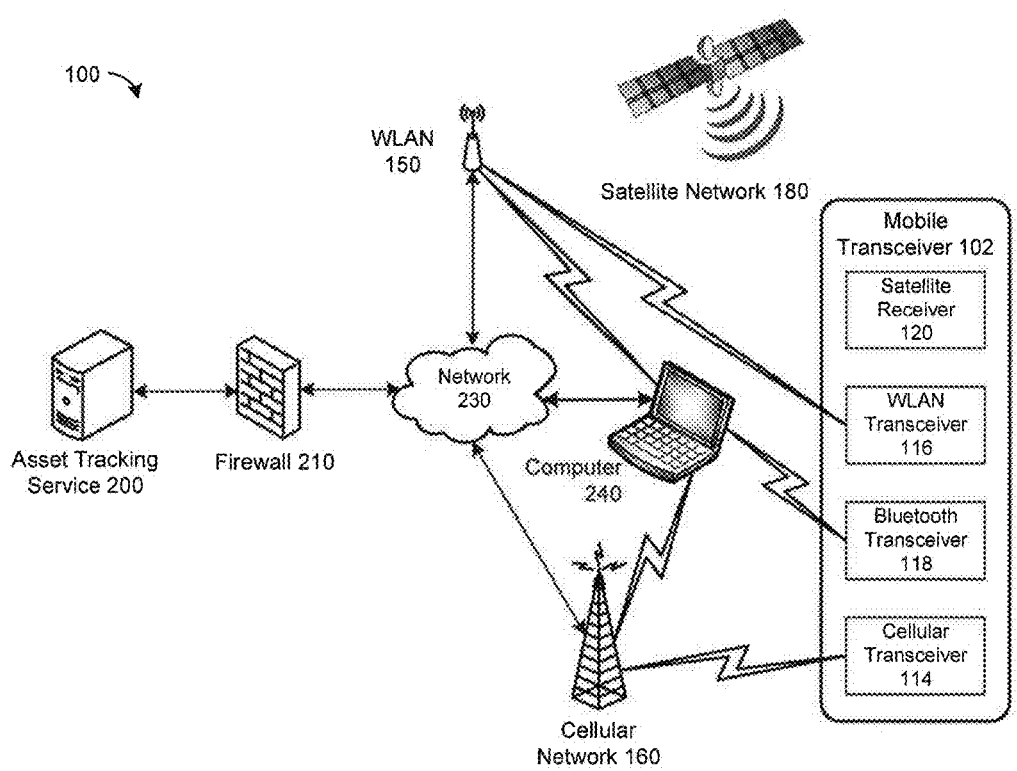
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that allows global and long-range tracking applications in which an asset in global and long-range transit can be tracked even though it crosses wireless carrier and network coverage boundaries while in transit. In global and long-range tracking applications the mobile transceiver and the asset being tracked will cross wireless carrier and network coverage boundaries while in transit. For example, it is not uncommon for a shipping container to originate in mainland China and travel around South Africa with a final destination in North America.

When the mobile transceiver wakes up after a period of inactivity, the cellular service that was last used may no longer be available. Additionally, if crossing continental boundaries and international borders, the wireless access technology and RF bands may not overlap. The present disclosure provides methods of operating the mobile transceiver (e.g., tracking device) for global and long-range tracking that is power efficient and that extends the expected life of the battery of the mobile transceiver. This is particularly advantageous when the mobile transceiver is provided with a non-rechargeable battery or when a rechargeable battery is provided but the mobile transceiver is used in environments when an external power source to recharge the battery is unavailable.

The mobile transceiver of the present disclosure may be used as a tracking device to monitor shipping containers. The mobile transceiver may be mounted to the exterior of a shipping container during transit. Alternatively, the mobile transceiver may be mounted on the interior of the shipping container and an antenna may be located on the exterior of the shipping container. The mobile transceiver periodically determines its location and the location of the shipping container and possibly other data.

The shipping container may be an intermodal freight container. An intermodal freight container is a large, standardized shipping container capable of being transported using ship, rail, or truck. The container is reusable and may be used for transportation and/or storage of a variety of contents. The containers are closed boxes constructed of steel with enough strength for the boxes to be easily handled, moved, and stacked during intermodal shipping. The containers may be standardized using one of two ISO standards: ISO 668:2013 Series 1 freight containers and ISO 1496-1:2013 Series 1 freight containers. Standard intermodal freight containers have exterior dimensions of 20 ft or 40 ft long, 8 ft wide, and 8.5 ft high. The interior of the container can be accessed using one or more of two corrugated weathering steel doors at one end which close flush to the main container's steel frame. The containers are constructed to withstand long periods of transport or storage where the container may not be opened for months or even years at a time.

In accordance with an example embodiment of one aspect of the present disclosure, there is provided a method of configuring a mobile transceiver, comprising: assigning an alarm profile to the mobile transceiver, wherein the alarm profile defines a plurality of alarms, each alarm including a trigger condition and one or more actions; receiving a message from the mobile transceiver; and sending the assigned alarm profile to the mobile transceiver in response to receiving the message from the mobile transceiver.

In accordance with an example embodiment of another aspect of the present disclosure, there is provided a server, comprising: a processor; a memory coupled to the processor, the memory storing executable instructions that, when executed by the processor, cause the server to perform the methods described above and hereinafter.

In accordance with an example embodiment of a further aspect of the present disclosure, there is a non-transitory machine readable medium having tangibly stored thereon executable instructions for execution by a processor of a server, wherein the executable instructions, when executed by the processor, cause the server to perform the methods described above and hereinafter.

In accordance with an example embodiment of yet a further aspect of the present disclosure, there is provided a method of operating a mobile transceiver having a processor, and a wireless transceiver and a satellite receiver each coupled to the processor, the method may comprise: sending to an asset tracking service a message including a device identifier (ID); receiving from the asset tracking service an alarm profile assigned to the device ID, wherein the alarm profile defines a plurality of alarms, each alarm including a trigger condition and one or more actions; storing the alarm profile in a memory of the mobile transceiver; and applying the alarm profile.

In some examples, each of the alarms is date-based, time-based, sensor-based, location-based or a combination thereof.

In some examples, the alarm profile is associated with an asset condition, wherein the asset condition is one of an asset type, asset contents, asset value or a driver profile.

In some examples, the alarm profile is associated with an asset condition, wherein the asset condition is one of refrigerated container, non-refrigerated container, high value container (or cargo) or low value container (or cargo).

In some examples, the method further comprises: before sending the message to the asset tracking service, determining an asset condition associated with the mobile transceiver based on one or more of the device ID and a container ID; assigning the alarm profile based on the determined asset condition.

In some examples, applying the alarm profile comprises: monitoring for one or more trigger conditions of the plurality of alarms in the alarm profile; waking up a processor from a low power mode in response to detecting one of the trigger conditions; identifying an alarm which was triggered based on the detected trigger condition by comparing the detected trigger condition to the alarms defined in the alarm profile; determining one or more actions to be performed based on the identified alarm; and performing the determined one or more actions associated with the identified alarm.

In some examples, the method further comprises: before monitoring, initiating a low power mode for a main processor, satellite receiver and wireless transceiver of the mobile transceiver.

In some examples, performing the determined one or more actions associated with the identified alarm comprises: activating a satellite receiver from a low power mode; determining a geolocation using the satellite receiver; and storing the geolocation in the memory of the mobile transceiver.

In some examples, performing the determined one or more actions associated with the identified alarm comprises: activating the wireless receiver from the low power mode; connecting to the asset tracking service via the wireless transceiver; and sending the geolocation to the asset tracking service.

In some examples, performing the determined one or more actions associated with the identified alarm comprises: acquiring sensor data using one or more sensors; and storing the sensor data in the memory of the mobile transceiver.

In some examples, performing the determined one or more actions associated with the identified alarm comprises: activating the wireless receiver from the low power mode; connecting to the asset tracking service via the wireless transceiver; sending the sensor data to the asset tracking service.

In some examples, the method further comprises: before acquiring sensor data, activating at least some of the one or more sensors from a low power mode.

In some examples, the one or more sensors comprise one or more of a light sensor, a temperature sensor, a pressure sensor, a humidity sensor, a gyroscope, an accelerometer, a time-of-flight sensor, an altimeter or a door contact switch.

In some examples, the one or more sensors comprise a light sensor, the method further comprising: measuring an amount of light using the light sensor; determining a door status as open when the measured amount of light is greater than or equal to a threshold; determining a door status as closed when the measured amount of light is less than the threshold.

In some examples, the one or more sensors comprise a time-of-flight sensor, the method further comprising: measuring a travel time using the time-of-flight sensor; determining a door status as open when the measured travel time is greater than or equal to a threshold, wherein the threshold is set by a container profile based on dimensions of a container to which the mobile transceiver is attached; determining a door status as closed when the measured travel time is less than the threshold.

In some examples, the one or more sensors comprise a time-of-flight sensor, the method further comprising: measuring a travel time using the time-of-flight sensor; determining a content status as empty when the measured travel time is greater than or equal to a threshold, wherein the first threshold based on dimensions of a container to which the mobile transceiver is attached, the dimensions being specified by a container profile stored in the memory of the mobile transceiver; determining a content status as full when the measured travel time is less than the threshold.

In some examples, the method further comprises: measuring a travel time using the time-of-flight sensor; determining a content status as empty when the measured travel time is greater than or equal to a first threshold, wherein the first threshold based on dimensions of a container to which the mobile transceiver is attached, the dimensions being specified by a container profile stored in the memory of the mobile transceiver; determining a content status as half-full or half-empty when the measured travel time is less than the first threshold but greater than or equal to a second threshold, the second throe being lower than the first threshold, wherein the second threshold based on dimensions of a container to which the mobile transceiver is attached, the dimensions being specified by a container profile stored in the memory of the mobile transceiver; determining a content status as fall when the measured travel time is less than the second threshold.

In some examples, the one or more sensors comprise an accelerometer, the method further comprising: measuring an amount of motion using the accelerometer; determining a door status as open when the measured amount of motion is greater than or equal to a threshold and a previously determined door status parameter stored in the memory of the mobile transceiver indicates that the door status is closed; determining a door status as closed when the measured amount of motion is less than the threshold and a previously determined door status parameter stored in the memory of the mobile transceiver indicates that the door status is open.

In some examples, performing the determined one or more actions associated with the identified alarm comprises: enabling or disabling one or more of the alarms on the alarm profile.

In some examples, performing the determined one or more actions associated with the identified alarm comprises: activating the wireless receiver from the low power mode; connecting to the asset tracking service via the wireless transceiver; sending an asset tracking log to the asset tracking service.

In accordance with an example embodiment of yet a further aspect of the present disclosure, there is provided a mobile transceiver, comprising: a processor; a memory coupled to the processor; a wireless transceiver coupled to the processor; a satellite receiver coupled to the processor; wherein the mobile transceiver is configured to perform the methods described above and hereinafter.

In accordance with an example embodiment of yet a further aspect of the present disclosure, there is provided a non-transitory machine readable medium having tangibly stored thereon executable instructions that, when executed by a processor of a mobile transceiver, the mobile transceiver comprising a memory, and a wireless transceiver and a satellite receiver each coupled to the processor, wherein the executable instructions cause the mobile transceiver to perform the methods described above and hereinafter.

Figure 2:
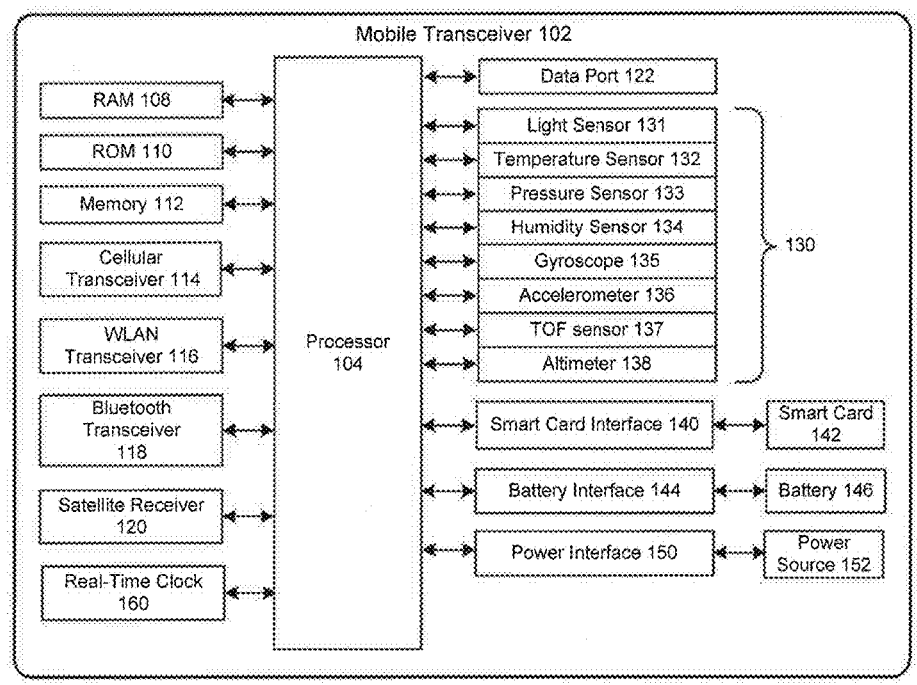
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), a plurality of environmental sensors 130 for sensing the environment of the mobile transceiver 102, and a real-time clock (RTC) 160. The mobile transceiver typically also includes a power management integrated circuit (PMIC) for managing power requirements of the mobile transceiver 102.

The RTC 160 is a low power subsystem that runs even when the mobile transceiver 102 is in deep sleep mode. The RTC 160 typically comprises a crystal oscillator that provides accurate real-time information, such as those provided by Atmel Corporation.

The sensors 130 may comprise a light sensor 131, temperature sensor 132, pressure sensor 133, humidity sensor 134, gyroscope 135, accelerometer 136, one or more time-of-flight (ToF) sensors 137, altimeter 138 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computing device 240, such as a personal computer or tablet. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service. It will be appreciated that the mobile transceiver 102 is intended for uninterrupted operation even though one or more components, such as the cellular transceiver 114, satellite receiver 120 and/or sensors 130 may be put into a low power mode periodically to conserve battery life. An initialization date or similar date when the mobile transceiver 102 was first powered on, e.g. when the battery 146 is first installed, may be used to determine the date and time of the first power-up. Due to the desire for uninterrupted operation, it is contemplated that the mobile transceiver 102 may lack a power button (on/off button) in some embodiments.

The mobile transceiver 102 may also include a power interface, such as a power port, for connecting to an external power source 152 such as an alternating current (AC) power adapter or the computing device 240. The power interface may be a USB port or other port for connecting to the external power source via a cable. The mobile transceiver 102 can use the external power source 152 rather than the battery 146. If the battery 146 is rechargeable, the external power source 152 may be used to recharge the battery 146.

Although the described embodiment includes a single processor 104, multiple processors, either in the same integrated circuit (IC) package or in different IC packages, could be used in other embodiments.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking service 200 may be implemented as one or more server modules and is typically located behind a firewall 210. The asset tracking service 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking service 200 such that no hardware or configuration information is necessary to access the functionality other than the API location and functional definitions as described herein.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption. The encryption keys for the encryption algorithm may be unique for each mobile transceiver 102 or may be unique to a particular customer having a plurality of mobile transceivers 102 (e.g. a fleet of shipping containers, etc).

The mobile transceiver 102 uses signals received by the satellite receiver 120 from a plurality of satellites in the satellite network 180 to determine its position. For example, the mobile transceiver 102 may use the satellite receiver 120 to determine its location in response to an alarm. An alarm is a wakeup event which causes the mobile transceiver 102, or a subsystem of the mobile transceiver 102 such as the processor 104, satellite receiver 120 or one or more sensors 130, to wake up from a low power mode such as a sleep mode and perform configured actions (e.g., performs measurements of location and sensors) which are then logged and/or reported to the asset tracking service 200. The alarm may be a time-based alarm which the subsystem wakes up at regular intervals in accordance with a predefined schedule among other possibilities. The frequency or schedule at which the location is determined may be fixed or configurable as the requirements of the customer dictates, for example, by changing the alarm profile.

The mobile transceiver 102 stores the determined location, typically in terms of latitude and longitude, in a data log stored in the memory 112 of the mobile transceiver 102. The values for latitude and longitude may be specified in one of a number of different formats including degrees minutes seconds (DMS), degrees decimal minutes (DDM), or decimal degrees (DD). A time at which the location was determined is typically also stored in the data log. The time may be specified using UTC time (Coordinated Universal Time), for example, as defined by International Telecommunications Union Recommendation (ITU-R TF.460-6). Time may be specified in 24 hr time hh:mm:ss format and date may be specified in dd:mm:yyyy format. Alternatively, local time may be supported as described below. The data log is sometimes known as an asset tracking log.

As noted above, the mobile transceiver 102 may also use one or more of the sensors 130 to sense or measure an environment of the mobile transceiver 102 in response to an alarm. For example, the sensors 130 may be used to measure temperature, pressure and humidity, as well as door open or movement events, among other parameters. The sensor data obtained via the sensors 130 and a time at which the sensor data was obtained are also stored in the data log (e.g., the asset tracking log), which is stored in the memory 112. The sensor data may not be the raw readings from the physical sensors but may be processed into container conditions such as door state, container contents, etc. As with the location data, the mobile transceiver 102 may collect sensor data at regular intervals, in accordance with a predefined schedule, or in response to an alarm. The frequency or schedule at which sensor data is obtained may be fixed or configurable, for example, by changing the alarm profile.

The mobile transceiver 102 attempts to connect to the asset tracking service 200 to report location and/or sensor data stored in the asset tracking log at regular intervals, in accordance with a predefined schedule, or in response to an alarm. The frequency or schedule at which the mobile transceiver 102 attempts to connect to the asset tracking service 200 may be fixed or configurable, for example, by changing the alarm profile.

The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (e.g., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated. The data log may be encrypted using the same or different encryption algorithm as used for transmission of the data between the asset tracking service 200 and the mobile transceiver 102.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and do not coincide, although the cycles may overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
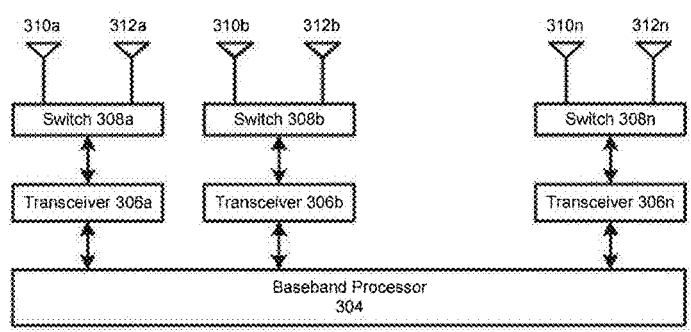
FIG. 3 is a block diagram illustrating a wireless communication subsystem in accordance with an example embodiment of the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container, whereas the internal antennas 310 typically serve as secondary antennas because of the increased RF interference associated with being located inside of the shipping container.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

Figure 4:
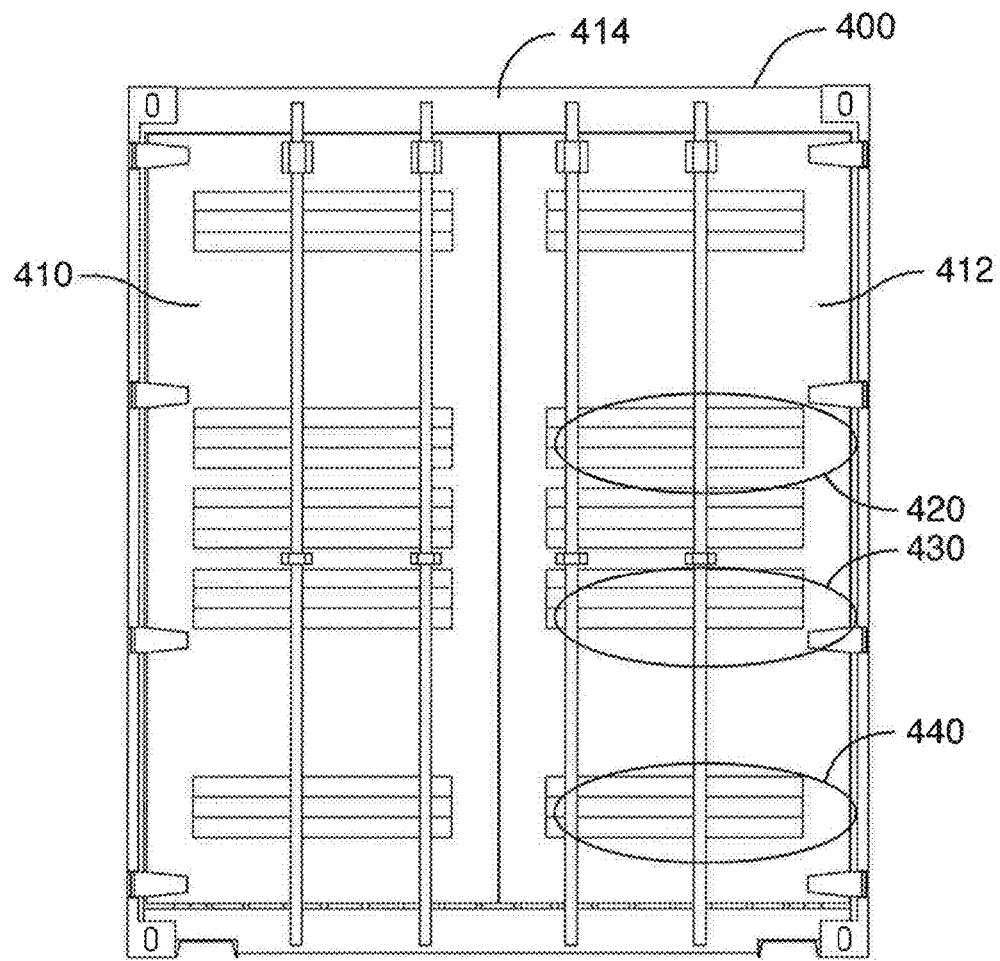
FIG. 4 is an example shipping container suitable for mounting a mobile transceiver in accordance with the present disclosure.

FIG. 4 illustrates an example shipping container 400, such as an intermodal freight container, suitable for mounting the mobile transceiver 102. The shipping container 400 includes a pair of interlocking doors 410, 412. The mobile transceiver 102 is mounted through one of the doors 410, 412 with the internal module 502 on the inside of the door 410 or 412, and the external module 504 on the outside of the door 410 or 412. Suitable mounting locations for the mobile transceiver 102 on the door 412 are represented by references 420, 430 and 440. While example mounting locations for the mobile transceiver 102 are located on the door 412, it will be appreciated that the mobile transceiver 102 could be mounted on any door of the shipping container 400, or possibly a wall of the shipping container 400. Mounting screws 610 are received in the mounting holes 512 in the front panel 510 of internal module 502 of the mobile transceiver housing 500, and are secured in thread holes (not shown) on the inside of the external module 504 of the mobile transceiver housing 500. In some embodiments, the internal module 502 and external module 504 may be further secured to the container door 412 using a suitable mounting adhesive, such as a suitable double-sided adhesive strip or tape.

Figure 5:
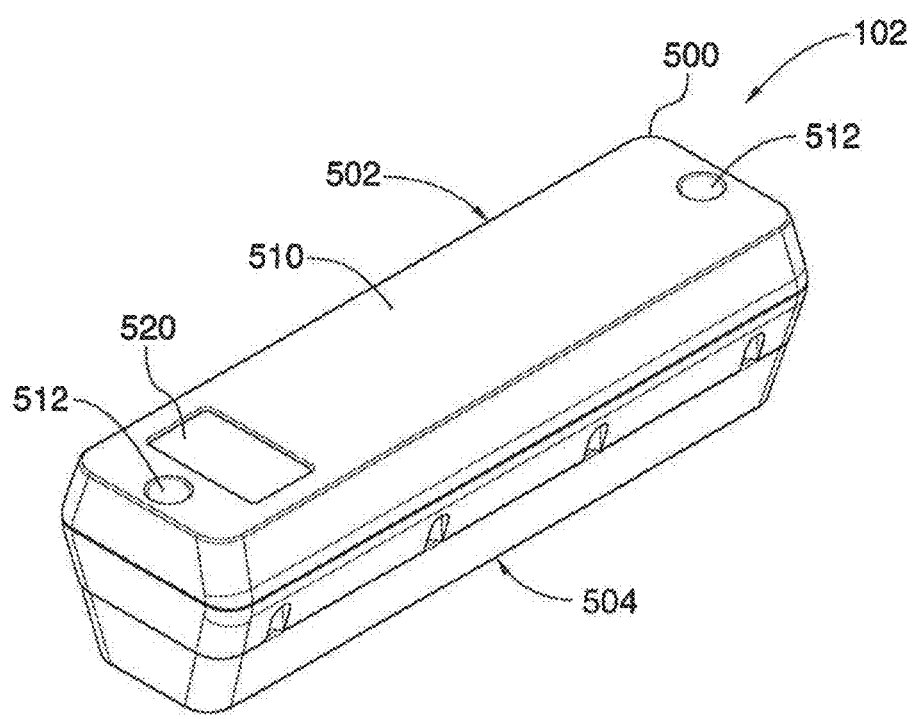
FIG. 5 is a perspective view of a mobile transceiver housing in accordance with one embodiment of the present disclosure.
Figure 6A:
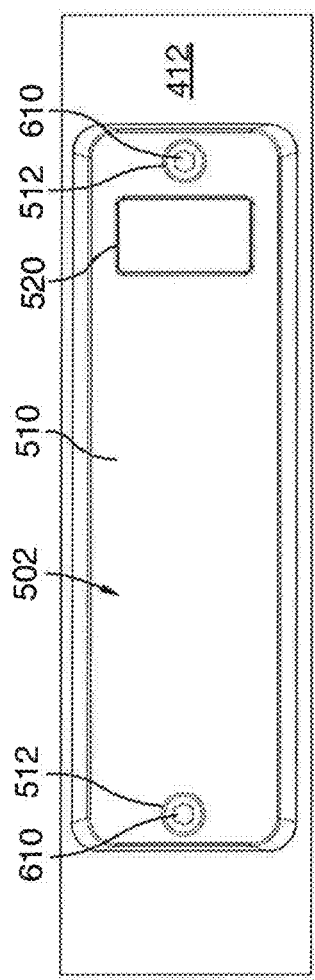
FIG. 6A is a front view of the mobile transceiver housing of FIG. 5 mounted to a door of the shipping container of FIG. 4 viewed from the interior of the shipping container.
Figure 6B:
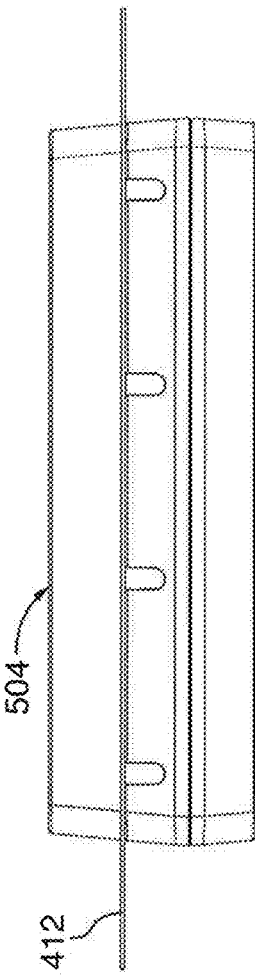
FIG. 6B is a side view of the mobile transceiver housing of FIG. 5 mounted to a door of the shipping container of FIG. 4.
Figure 6C:
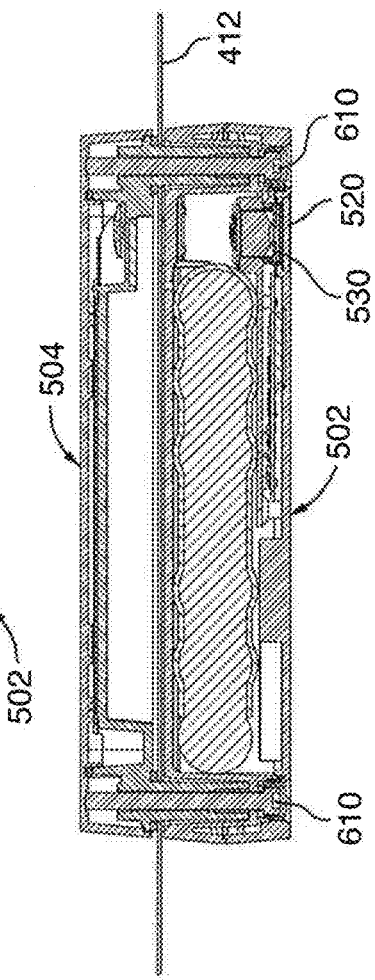
FIG. 6C is a sectional view of the mobile transceiver housing of FIG. 5 mounted to a door of the shipping container of FIG. 4.

FIG. 5 illustrates a mobile transceiver housing 500 of the mobile transceiver 102 in accordance with one example embodiment of the present disclosure. The housing 500 is a two-part, interconnected module, configured to be mounted to a shipping container, for example, through a door of the shipping container. The housing 500 comprises an internal module 502 and an external module 504. The internal module 502 is configured to be mounted on the interior of the shipping container, for example, on an inside surface of a door of the shipping container. The external module 504 is configured to be mounted on the exterior of the shipping container, for example, on an outside surface of the door of the shipping container. The external module carries the external antennas 312. The internal module carries the internal antennas 310, and most of the other electronic components of the mobile transceiver 102.

The internal module 502 and external module 504 are connected to each other, for example, by mounting screws (or bolts) when mounted to a shipping container 400 or other asset. A pair of mounting screws is used in the shown embodiment. A different number of mounting screws could be provided in other embodiments. In preparation for mounting the mobile transceiver 102, three holes are formed in the door of the shipping container using drilling or the like. Alternatively, the holes may be performed in the shipping container. Two of the holes are provided to receive the mounting screws while the third hole is used to pass through electronics from the internal module 502, such as external antennas for the cellular transceiver 114 and satellite receiver 120 and associated circuitry, to be carried in the external module 504 in the mounted mobile transceiver 102. In the shown embodiment, two holes 512 are formed in the front panel 510 of the internal module 502 for receiving the mounting screws. Corresponding holes are located in the bottom of the internal module 502. A hole in the bottom of the internal module 502 is also provided for receiving the electronics. The front panel 510 of the internal module 502 also includes a light transmissive panel 520, such as a transparent panel.

The housing 500 defines a sensor compartment for receiving at least some of the sensors 130 located opposite to the transmissive panel 520. The sensor compartment carries the light sensor 131 and the one or more ToF sensors 137. In the described embodiment, two ToF sensors 137 are carried in the sensor compartment. In some embodiments, one ToF sensor 137 may be configured for long-range sensing and the other ToF sensor 137 may be configured for short-range sensing. In some embodiments, the measuring range of the ToF sensors 137 may be configurable, for example, using software. In at least some embodiments, each ToF sensor 137 comprises an integrated circuit (IC), a light emitting diode (LED) emitter, and a LED received. The ToF sensors 137 may be mounted together with the light sensor 131 on a printed circuit board (PCB), such as a flexible PCB, carried in the sensor compartment.

The light sensor 131 is configured and positioned within the sensor compartment for sensing light outside of the mobile transceiver 102 through the transmissive panel 520. The first sensor 137 is configured and positioned within the sensor compartment for detecting objects in a first direction through the transmissive panel 520 outside of the mobile transceiver 102, i.e. within the interior of the shipping container when the mobile transceiver 102 is mounted to the shipping container. For example, the first ToF sensor 137 may be used for detecting objects within the interior of the shipping container by measuring the distance between the mobile transceiver 102 and the nearest object in the first direction, and determining whether the shipper container is loaded (e.g., one or more objects detected) or unloaded (e.g., no objects detected). The second ToF sensor 137 is configured and positioned within the sensor compartment for measuring the distance in a second direction between the second ToF sensor 137 and an inside surface of the front panel 510. The distance between the second ToF sensor 137 and an inside surface of the front panel 510 should be fixed. A change in the distance measured by the second ToF sensor 137, such as increase in the sensed distance, provides an indication of an abnormal antenna condition of the external antenna in that the external module 504 may be damaged or may have been tampered with. In the described embodiment, the ToF sensors 137 are configured to face opposite directions so that one sensor measures distance and the other sensor is used to detect the presence or absence of the external antenna module. Alternatively, in other embodiments the ToF sensors 137 may be configured to face the same direction and measure distance in different ranges, i.e., short range and long range, for increased accuracy. Alternatively, two ToF sensors 137 may be configured to face the same direction and measure distance in different ranges while one or more ToF sensors face the opposite direction to detect the presence or absence of the external antenna module.

The ToF sensor 137 may be configured and positioned within the sensor compartment for detecting objects in a first direction through a transmissive panel in a housing of the mobile transceiver 102 and outside of the mobile transceiver 102, e.g. within the interior of the shipping container when the mobile transceiver 102 is mounted to the shipping container. The ToF sensor 137 may be used for detecting objects within the interior of the shipping container by measuring the distance between the mobile transceiver 102 and the nearest object in the first direction, and determining whether the shipper container is loaded/full (e.g., one or more objects detected) or unloaded/empty (e.g., no objects detected). Alternatively, a camera could be used to determine if the container is full or empty.

Figure 7:
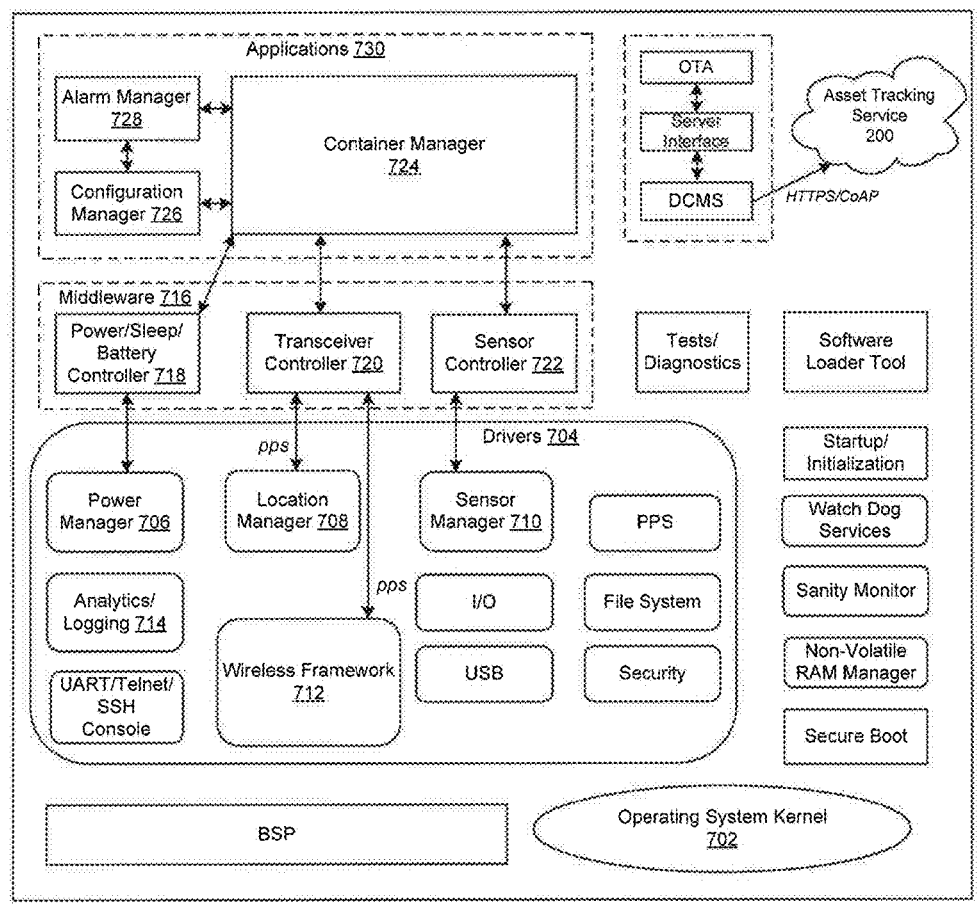
FIG. 7 is a block diagram of the software architecture of the mobile transceiver in accordance with the example embodiments of the present disclosure.

FIG. 7 is a block diagram of the software architecture of the mobile transceiver in accordance with the example embodiments of the present disclosure. The processor 104 may perform a number of processes using the stored software I in the memory 112 by interfacing with various hardware components of the mobile transceiver 102 as shown in the example of FIG. 7. The software modules include an operating system kernel 702, drivers 704, middleware 716 and applications 730. The drivers 704 include a power manager 706, a location manager 708, a sensor manager 710, a wireless framework 712, and an analytics/data logging module 714. The middleware 716 includes a power/battery/sleep controller 718, transceiver controller 720, and sensor controller 722. A number of applications 730 execute on top of the operating system kernel 702 such as a container manager (asset manager) 727, a configuration manager 726 and an alarm manager 728, as described in further detail below.

The container manager 724 collects and packetizes data collected by the mobile transceiver 102, and sends it to the asset tracking service 200 through a server agent interface. The packetized data may use JSON (JavaScript Object Notation) formatting. The container manager 724 may also receive data from the asset tracking service 200 through the asset tracking service 200, which it processes or dispatches to the appropriate module. For example, received device configuration data is dispatched to the configuration manager 726.

The container manager 724 also receives notifications (events) from the server agent interface about network status. For example, whether all data has been transmitted and received by the asset tracking service or whether new data has been received from the asset tracking service.

Events received from the alarm manager 728 include instructions as to what data needs to be gathered and sent to the asset tracking service 200. The container manager 724 follows the instructions received from the alarm manager 728 and collects and packetizes the data that is then transmitted to the asset tracking service 200. For example, an alarm event may specify that location, temperature, humidity and light level should be collected and sent to the asset tracking service 200.

Any data that is not received by the asset tracking service 200 is saved in the file system in memory 112 and an attempt to send the queued data may be made the next time an alarm is triggered and communication is established to the asset tracking service 200. The amount of queued data is based on the capacity of the memory 112. Once the memory 112 is full, older data is overwritten. In some embodiments, the backup data allows storage of 100,000 events with each event having a size approximately equal to 1 KB. The total amount of memory 112 may be 100 MB. The asset tracking service 200 acknowledges any received data so that the mobile transceiver 102 may discard acknowledged data. Alternatively, the data may be maintained within the memory 112, for example, for diagnostic purposes until overwritten.

The container manager 724 also controls the wireless transceivers and satellite receiver 120 through the middleware layer, for example, using a Persistent Publish/Subscribe (PPS) interface provided by the wireless framework, such as that provided by QNX Software Systems Limited.

In some embodiments, virtual sensors are provided. For example, "door" and "contents" sensors may be virtual in that to obtain door open/close status several physical sensors 130, such as accelerometer 136 and light sensor 131 may be used with an algorithm that detects the condition. The same may apply for contents full, empty or half condition. This value depends on an algorithm that considers the container dimensions and readings from the ToF sensor 137. As a result, not all "sensor" data transmitted to the asset tracking service 200 may not be raw readings obtained from physical sensors 130. Instead, some of the sensor data is converted by software on the mobile transceiver and converted to container conditions such as door state, container contents, etc. while other sensor data, such as temperature and humidity is directly obtained from physical sensors 130.

The configuration manager 726 receives, parses and stores device configuration data which stores an alarm profile, and receives and stores the container profile which includes data about the container to which the mobile transceiver 102 is attached. The device configuration data and container profile data may also be stored in the JSON format, and may be compressed and/or encrypted. The encryption/decryption and compression/decompression, if any, is done by the server agent interface and asset tracking service 200. The configuration manager 726 also validates any new device configuration data received from the asset tracking service 200 and reports back any errors.

The assigned device configuration data may be stored in the file system whereas the default device configuration is stored in ROM. Therefore, if the software is re-flashed this would completely update the file system and delete any assigned device configuration that have been downloaded and stored in the file system, which would then have to be obtained from the asset tracking service 200. An OTA update would not delete the configuration files saved in the file system as it uses a patching method to update files.

The alarm manager 718 receives the alarm profile from the configuration manager 726, and sets the alarms based on an active alarm profile. When a new device configuration is received by the configuration manager 726, it informs the alarm manager 728 so that the new alarm profile is applied. The old alarm profile may be deleted.

RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

The RTC 160 is used for date-based and time-based alarm since it runs even when the mobile transceiver 102 is in deep sleep mode. The RTC 160 is configured with the next possible alarm date/time selected by the alarm manager 728 by searching all date and time alarms. Once the next date/time trigger is set in the RTC 160, it will generate an interrupt to wake up the processor 104 when the date/time is reached. It is possible for two or more date/time alarms to fall on the same calendar date and time. In such cases, when the RTC 160 may interrupt fire and the alarm manager 728 executes the instructions for all the matching date/time alarms. It is possible for the next date or time alarm to be due while processing an RTC interrupt generated alarm. For example, this can occur if the processing for a date alarm takes 3 minutes but the next time alarm is in 2 minutes. In such cases, the alarm manager 728 process the due alarm, as if it had triggered an interrupt, before programming the RTC 160 with the next date/time.

For maximum flexibility date-based and time-based alarms may be specified in local time based on container current location, specified using UTC time (Coordinated Universal Time), for example, as defined by International Telecommunications Union Recommendation (ITU-R TF.460-6). For simplicity, alarms may be limited to UTC time. To simplify time tracking, the RTC may be programmed with UTC time with all alarm events should be configured in UTC time. Time may be specified in 24 hr time hh:mm:ss format and date may be specified in dd:mm:yyyy format. Alternatively, date-based and time-based alarms may be specified in a given time zone, for example, the time zone for the customer headquarters. When local time is supported, UTC time can be converted to local time based on the time zone in which the container is located for RTC setup (for example, based on the time zone indicated by the cellular network) and alarm processing.

The alarm manager 728 configures the interrupt capable sensors based on the active alarm profile and possibly the enabled/disable status of the alarms in the active alarm profile, if supported. The sensors send an interrupt signal to wake up the alarm manager 728 when a trigger condition is detected. The alarm manager 728 wakes up and handles the interrupt, sending the corresponding event to the container manager 724 with the action instructions.

It is possible for two or more sensor alarms to be triggered at the same time, since a sensor value may satisfy the condition parameters for more than one alarm. In such cases, the alarm manager gathers the action instructions for all the matching alarms.

Nested alarm interrupts are also possible. For example, while processing an interrupt from the RTC 160 or sensor 130 another interrupt may be triggered. The alarm manager 728 handles each interrupt by queuing the interrupt requests and processing the requests in order. To facilitate processing and avoid endless loops, interrupts being processed may be acknowledged and re-enabled only after all processing is completed. After processing all triggered alarms, the alarm manager 728 may examine future alarm events and choose to process the future alarm events if scheduled to happen within a short period of time. This avoids waking up shortly after going to deep sleep.

The Power/Sleep/Battery Controller 718 provides the functions for managing the device power, battery and sleep mode, which may be implemented as an API that interfaces with the drivers. The Power/Sleep/Battery Controller 718 comprises three submodules a power manger, a battery manager, and a sleep manager. The power manger performs power management, such as setting correct voltage levels and CPU frequency to save device power consumption based on load.

The battery manager detects that a low battery level has been reached and the remaining expected battery life is below a critical threshold. When below the critical threshold, this condition will be sent to the asset tracking service 200. The battery manager may also provide a fuel gauge which provides battery status, charge level percentage, current voltage, consumption rate, expected life expectancy, etc. Alternately, if no fuel gauge is available, the battery manager will provide whatever information can be obtained, if any, for example, by reading the voltage level if possible.

The sleep manager performs the setting of the hardware into sleep mode. The container, configuration and alarm managers inform the sleep manager whether the modules are active or idle by using an API provided by the sleep manager. For this purpose, a shared memory semaphore, a shared memory bit map, an API interface, etc. may be used. Activity on the data port 122 indicates that a manufacturing tests and/or user debugging is being run, and that mobile transceiver 102 should not go to sleep.

To enter sleep in some embodiments, the wireless transceivers are powered off, some sensors may be powered off (for example, if there are no enabled alarms currently triggering on them), watchdog functions are disabled, the RTC 160 is to run and the device is set to run using the low speed clock, and the processor is set to sleep. The satellite receiver 120 is kept awake. Alternatively, the satellite receiver 120 may be powered off.

The alarm manager 728 sends the event to end sleep. Alarms triggered by interrupts are used to wake up the processor 104 from sleep. To complete the wake up, an event or a software interrupt is sent from the alarm manager 728 to the sleep manager. The container manager 724 and the configuration manager 726 inform the sleep manager that the modules are active as soon as events are received and the modules are waken up. When all processing has been completed by the modules, the modules send notifications to the sleep manager 728 that the modules have completed processing and ready to sleep.

To exit sleep in some embodiments, the wireless transceivers are powered on, some sensors that were powered off are powered on if needed by the active alarm profile, watchdog functions are enabled if needed, the RTC 160 is to run, the device is set to run using the high speed clock, and the processor is awaken. The satellite receiver 120 may be awaken if powered off and if needed.

Alternatively, the wireless transceivers power on/off determination could be implemented in the container manager 726 since it will know when the wireless transceiver is needed and when it may be turned off.

Asset-Based Alarm Profile and a Method of Operation

The mobile transceiver 102 is intended to be attached to, or incorporated in, a moveable asset to track its location using a satellite receiver 120 and/or sense or measure other conditions, such as temperature, humidity, general operating conditions, average speed, maximum speed, content status, door open or closed condition, etc. using the sensors 130. The asset tracked by the mobile transceiver 102 may be a shipping container, truck, rail car, automobile, etc.

Figure 8:
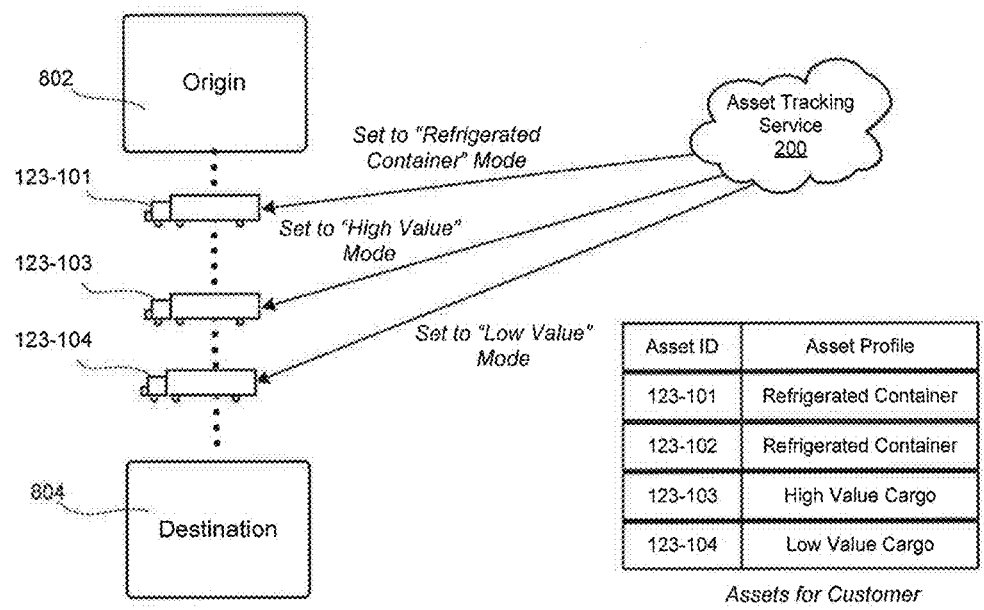
FIG. 8 is a schematic diagram illustrating a plurality of deployed mobile transceivers in communication with an asset tracking service in accordance with the present disclosure.

FIG. 8 illustrates a plurality of deployed mobile transceivers 102 in communication with the asset tracking service 200. Each of the mobile transceivers 102 is mounted to a container having an associated ID, such as 123-101, 123-102, 123-103 and 123-104 in the shown example. The containers are loaded on a truck for transport between an origin 802, such as warehouse, and a destination 804, such as a factory or store, possibly with a number of intermediate waypoints in between. The containers may be transported along a predefined route. The predefined route may be defined in a travel itinerary that defines a number of waypoints (e.g., locations) including the origin, destination and possibly a number of intermediate waypoints along the intended route. Each waypoint corresponds to a location or geographical area along the intended route.

The mobile transceivers 102 are used to gather information about the container or other asset being monitored and send this information back to the asset tracking service 200 from time-to-time. The data which is gathered and the frequently of the reporting may vary based on tracking requirements. For example, when the mobile transceiver 102 is battery operated, longer battery life may be preferred over more frequent updates in some applications. However, in other applications more frequent updates may be preferred at the expense of battery life. For another example, data provided by some of the sensors 130 may not be used in some applications. However, in other applications more frequent and/or stringent sensor data updates may be desired. For yet another example, a group of managed mobile transceivers 102 may have the same tracking requirements in some applications. However, in other applications different mobile transceivers 102 in a group of managed mobile transceivers 102 may have different tracking requirements.

The present disclosure uses alarm profiles to allow for diverse customization of the operation of the mobile transceiver 102. The alarm profile to be applied by a particular mobile transceiver 102 may be updated while the mobile transceiver 102 is in the field, for example, over-the-air (OTA) using a wireless transceiver such as the cellular transceiver 114. The present disclosure also provides a method, system and related devices that allow new or different alarm profiles to be individually assigned and applied to individual mobile transceivers 102 deployed in the environment to meet the specific tracking requirements.

Each alarm profile defines one or more number of alarms. As described in more detailed below, the alarms are defined by a trigger type, a trigger condition to be satisfied for the alarm to be triggered, and one or more actions to take when the alarm is triggered. The alarm types are date-based, time-based, sensor-based, location-based (e.g., geofence) or a combination thereof. The alarms associated with an active alarm profile may be active (enabled) or inactive (disabled) and alarms may be enabled or disabled by other alarms that have been triggered. For example, if the temperature surpasses a trigger point, another alarm may be enabled to trigger if the temperature decreases below a lower value. Disabled/inactive alarms in the active alarm profile are ignored.

Each alarm profile specifies the functionality of the mobile transceiver 102, including the functionality of the cellular transceiver 114, satellite receiver 120 and/or sensors 130 with respect to data logging and reporting activities. Each alarm profile defines a different operational profile of the mobile transceiver 102, including when and what data (e.g., location and/or sensor data) is to be measured, stored and transmitted to the asset tracking service 200. New alarm profiles may be created as needed based on customer requirements. The device configuration and alarm profile associated therewith may be managed as a value added service provided by a third party service provider who maintains or controls the asset tracking service 200, or the device configuration may be managed directly by users.

In some examples, the alarm profiles are associated with an asset condition. The asset condition may be any one of an asset type, asset contents, asset value or driver profile in some embodiments. In other embodiments, the asset condition may be any one of a route, location, sensor data (e.g., temperature, humidity, door open/closed, etc.), time, alarm status (e.g., whether any alarms triggered, alarms that are triggered), asset type, asset contents, asset value, driver profile or other asset condition.

The asset types may include cargo/container or vehicle, or more specifically oil truck, milk truck, service truck, freight truck, taxi/limo, rental car, intermodal container, crate, tank container, gas tank, insulated shipping container, flexible intermediate bulk container, intermediate bulk container, etc.

The asset contents may include, refrigerated, non-refrigerated, perishable, dry good cargo, farm produce, construction materials, logging goods, oil, weapons, aviation contents, flammable liquids, liquid hydrogen or other super cooled liquids, poisonous materials/liquids, radioactive materials, explosive, radioactive, confidential documents, poisonous, flammable, perishable, dry goods, logs/woods, etc.

The asset value may be high value or low value (or non-high value).

The driver profile may be good, bad or other rating.

In other examples, the alarm profile may be associated with a travel mode describing a mode of transportation being taken. The travel modes may include, but are not limited to, "Rail", "Ship", "Street", "Dock", "Home", "Warehouse", "Distribution Centre", "Outside", "Inside", "Parked", etc.

A number of predefined alarm profiles may be provided by the asset tracking service 200, each associated with the asset condition. A predefined alarm profile associated with the asset condition may then be selected and assigned to a mobile transceiver 102, for example, by the asset tracking service 200.

Each mobile transceiver 102 is associated within an asset, which may be identified by an asset ID (e.g., container ID). The asset tracking service 200 maintains records of the device to asset relationships, for example, based on device ID and container ID. This information may be stored in an asset database (not shown). The asset tracking service 200 may automatically assign an alarm profile based on the asset condition, which may be specified in an asset profile (e.g., container profile) stored by the asset tracking service 200 in the asset database. The container profile includes data describing the asset to which the mobile transceiver 102 is to be attached. For example, the container profile may comprise a container ID (e.g., serial number) and one or more of a container type, container dimensions, container cargo/containers, container owner and possibly other data from which an asset condition may be determined. Alternatively, the asset condition may be explicitly defined in the container profile.

The process of automatically assigning an alarm profile to a mobile transceiver 102 may comprise determining the container ID from the device ID, determining asset condition associated with the container (for example, using the container ID mapped to the mobile transceiver 102 and the associated container profile), and determining the alarm profile to be used based on the asset condition. If a single mapping is maintained, the alarm profile ID may be determined directly from the device ID.

The device configuration, including the alarm profile, assigned to each asset/device is downloaded over the air to the mobile transceiver 102 from the asset tracking service 200 once the asset tracking service 200 establishes communication with the mobile transceiver 102.

In some embodiments, predefined alarms may be customized by a system administrator or a custom alarm profile may be created by a system administrator.

Alternatively, an alarm profile based on the asset condition may be assigned by a system administrator rather than the asset tracking service 200. For example, assets may be shown on a user interface screen in the following format when the asset tracking service is accessed via a web-based portal:

| Asset ID | Alarm Profile |
| --- | --- |
| 123-101 | Refrigerated Container |
| 123-102 | Refrigerated Container |
| 123-103 | Low Value Cargo |
| 123-104 | High Value Cargo |
| 123-105 | Not Assigned |

The system administrator may then assign an appropriate alarm profile based on the asset condition via interfacing with the user interface.

In some embodiments, multiple alarm profiles may be stored in the memory 112 of the mobile transceiver 102 in some embodiments, with one of the alarm profiles being set as the active alarm profile. The mobile transceiver 102 may set one of the one or more stored alarm profiles as an active alarm profile in response to a message or instruction from the asset tracking service 200 to change the tracking functionality of the mobile transceiver 102. In some embodiments, a number of alarm profiles may be set along with a date and/or time to be applied based on each leg of a multi-alarm profile route for the asset.

The provision of a number of selectable pre-configured alarm profiles is advantageous in that the mobile transceiver 102 may be configured in an improved manner than obviates the need to configure every sensor, etc. This is also advantageous in that common hardware may be used and deployed, with functionality of any one or more of the mobile transceivers 102 capable of being changed dynamically in the field, thereby decreasing the cost of production and support. While there is a cost associated with acquiring hardware having features that may not always be used, this cost may be outweighed by the cost savings achieved by obviating the need to remove hardware in the field and replace it with hardware having the desired hardware, thereby reducing the total cost of ownership (TCO).

The provision of a number of selectable pre-configured alarm profiles is also advantageous in that different alarm profiles may be used without updating the device software each time an alarm profile is to be changed. This avoids downloading different software and/or device configurations each time the alarm profile for an asset changes, thereby conserving power and computing resources and allowing the functionality of the mobile transceiver 102 to be highly configurable. This is also advantageous in that common software may be used and deployed, with functionality of any one or more of the mobile transceivers 102 capable of being changed dynamically in the field, again decreasing the cost of production and support. The cost savings achieved by obviating the need to remove hardware in the field and either update its software or replace it with hardware having the desired software, further thereby reducing the TCO.

Furthermore, the active alarm profile is typically selected by the asset tracking service 200, thereby conserving power and computing resources of the mobile transceiver 102 by allowing the mobile transceiver 102 to serve as a thin client. The use of a server-specified alarm profile also allows centralized control over a group (or fleet) of managed devices, further reducing the TCO as well as allowing either individual, remote control of a particular mobile transceiver 102 or synchronized, remote control of a group of managed devices.

Figures 9A, 9B:
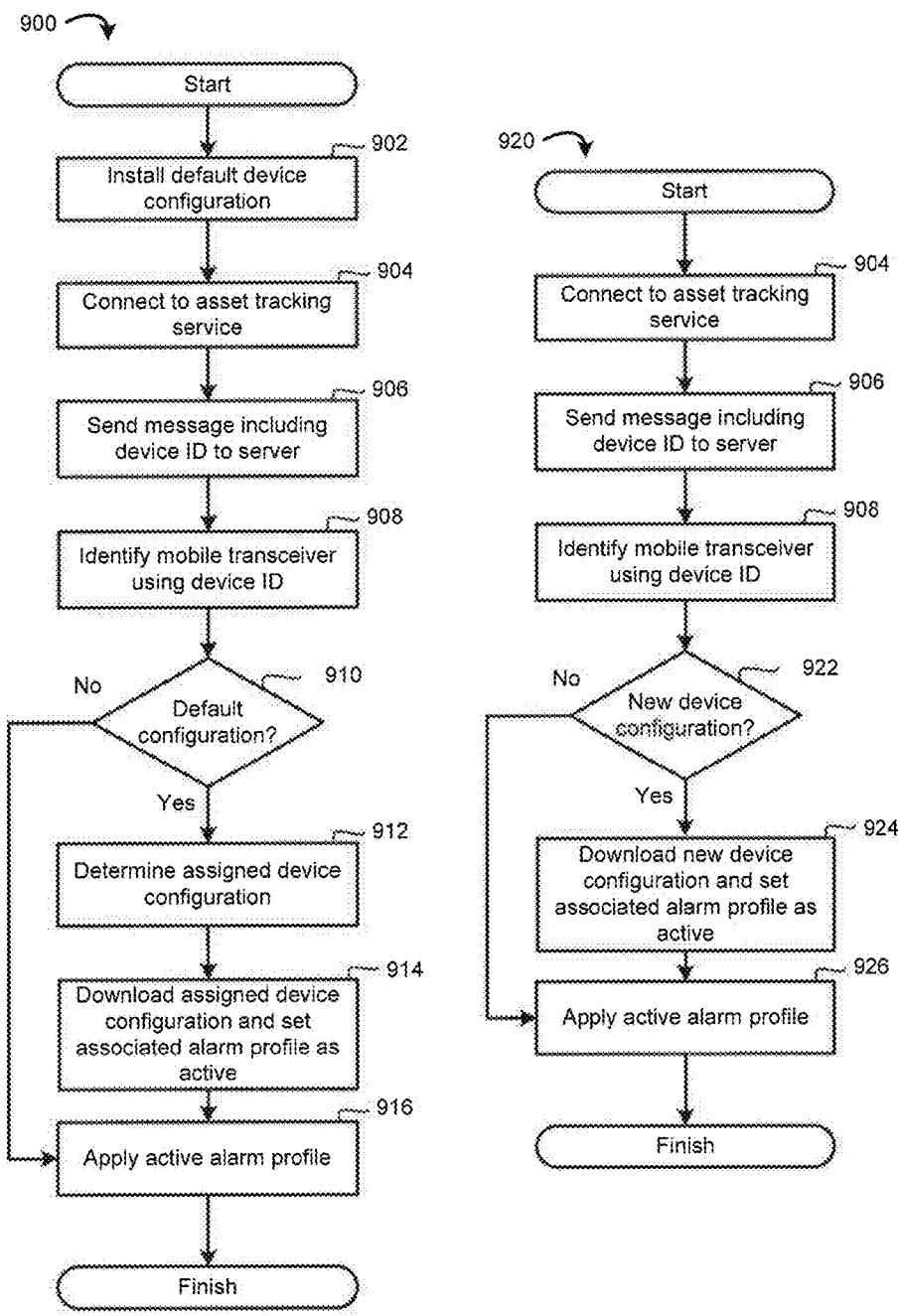
FIGS. 9A and 9B are flowcharts illustrating methods of setting an alarm profile in accordance with example embodiments of the present disclosure.

FIG. 9A shows an example flowchart of a method 900 of setting an assigned device configuration for a mobile transceiver 102 such as a GNSS tracking device in accordance with one example embodiment of the present disclosure. The method may be carried out by software executed by a processor of the mobile transceiver 102. Coding of software for carrying out such a method 900 is within the scope of a person of ordinary skill in the art provided the present disclosure. The method 900 may contain additional or fewer processes than shown and/or described, and may be performed in a different order in other embodiments. Machine readable code executable by the processor to perform the method 900 may be stored in a machine readable medium such as a memory of the mobile transceiver 102.

At 902, a default device configuration is installed on the mobile transceiver 102, for example, by storing in the memory 112. The default device configuration may be installed at the factory or another time prior to deployment in the field. The default device configuration includes at least enough information to communicate with the asset tracking service 200 at a first power-up since communications are typically initiated by the mobile transceiver 102 rather than the asset tracking service 200 to conserve battery life. Once communication is established, an assigned device configuration including an assigned alarm profile associated with the asset being tracked can be downloaded from the asset tracking service 200 for use instead of the default device configuration.

The default and assigned device configurations are defined by one or more device configuration files. The default device configuration may include other data only needed at the first power-up. For example, the default device configuration may indicate that one or more LEDs be flashed on power-up to provide a notification that the mobile transceiver 102 is powered on and/or connecting (or connected) to the asset tracking service 200.

The device configuration data may define a default alarm profile defining one or more alarms. The following table has an example of the default configuration file, which wakes up every 15 minutes and tries to communicate with the asset tracking service 200.

| Alarm Number | Alarm Type | Trigger Condition Parameters | Action(s) when condition met |
|---|---|---|---|
| 1 | Time | Wake up every 15 minutes | Send message indicating device is using default configuration. |

The device configuration data may also include a Uniform Resource Locator (URL) of the asset tracking service 200 if not stored elsewhere. The device configuration data may also include a device configuration identifier (ID) such as a name to identify it from other different configurations. The device configuration data may also include other data such as sensor configurations, wireless transceiver configurations, allowed radio technologies, roaming rules, and one or more geolocations. If any of sensor configurations, wireless transceiver configurations, allowed radio technologies, roaming rules are not defined in the assigned device configuration, default values from the default device configuration are used.

The default device configuration may be stored in the ROM 110 so that a backup of the default device configuration is always available in the event that the assigned device configuration becomes corrupted, deleted or lost. Also, if the device software is re-flashed, this would update the default device configuration as it would be embedded with the device software.

In normal operation, when the mobile transceiver 102 is initially powered up and used, for example when the battery 146 is first connected after the mobile transceiver 102 is installed and/or mounted to the asset being tracked, the mobile transceiver 102 operates in accordance with the default device configuration. The configuration manager 426 executing on the mobile transceiver 102 loads the default device configuration and causes the mobile transceiver 102 to operate based on the default device configuration.

As noted above, the default configuration typically includes a default alarm profile which specifies that the mobile transceiver 102 wakes up periodically, for example every fifteen minutes or other reasonable interval, and attempts to establish communication with the asset tracking service 200. To save battery life, the default alarm profile may specify that after a threshold duration, for example one hour, that the mobile transceiver 102 wake up at progressively longer intervals, for example every hour or even once a day, until the first communication with the asset tracking service 200 occurs. This progressively longer wake up period may be overridden by disconnecting the power source (e.g. battery) or alternatively by toggling a power button on/off (if one exists) or pressing a reset button (if one exists).

In other embodiments, the default device configuration may not include a default alarm profile. For example, the default device configuration may specify that the mobile transceiver 102 attempt to establish communication with the asset tracking service 200 until the first communication is established, or until a threshold duration of time has lapsed without establishing communication at which time the mobile transceiver 102 may power off until the battery 146 is removed and reinstalled (which the mobile transceiver 102 retreats as a first power-up), a power button is toggled on/off (if one exists) or a reset button is pressed (if one exists).

At 904, the mobile transceiver 102 establishes communication with (e.g., connects to) the asset tracking service 200 over the Internet, typically via the cellular transceiver 114.

At 906, the mobile transceiver 102 sends a message to the asset tracking service 200 which includes identifying device information about the mobile transceiver 102. The identifying device information may comprise the device ID. The device ID may be a PIN, IMEI of the wireless cellular transceiver 114, MAC address or other unique ID. The message may include only the device ID since the device configuration assigned to the mobile transceiver 102 can be determined based solely on the device ID. However, the message may optionally include location and/or sensor data captured by the mobile transceiver 102 after the first power-up.

At 908, the asset tracking service 200 identifies the mobile transceiver 102 based on the device ID.

At 910, the asset tracking service 200 determines whether the mobile transceiver 102 is using a default configuration. This determination may be based, for example, on a device configuration ID in the message or information about the mobile transceiver maintained by the asset tracking service 200. For example, the asset tracking service 200 may determine that the mobile transceiver 102 is using a default configuration based on the device ID when the mobile transceiver 102 is on its first power-up. The asset tracking service 200 may determine that the mobile transceiver 102 is on its first power-up in many ways, including the lack of any previous message or communication from the mobile transceiver 102 (based on its device ID) or possibly other information in the message.

At 912, when the mobile transceiver 102 is determined by the asset tracking service 200 to be using the default device configuration, an assigned device configuration assigned to the mobile the mobile transceiver 102 and an associated asset profile (e.g., container profile) is determined based on the device ID by comparing to the device ID to an asset database (not shown). The assigned device configuration defines an alarm profile and possibly other data, as described above.

When the asset profile is a container profile, the container profile comprises data including a container ID (e.g., serial number) and one or more of a container type, container dimensions, and container owner and possibly other data. The container profile is stored in a container profile file downloaded from the asset tracking service 200. When a mobile transceiver 102 is linked to a specific container by the asset tracking service 200, the container profile is obtained and stored by the asset tracking service 200. The container dimensions may be used by the ToF sensor 137, for example, to determine whether the status of the contents of the container or the door status.

At 914, the mobile transceiver 102 downloads the assigned device configuration and asset profile (e.g., container profile).

At 916, after the assigned device configuration and container profile are downloaded, the configuration manager 426 executing on the mobile transceiver 102 receives the assigned device configuration and the associated alarm profile, and stores it in memory, such as the memory 112, typically in the file system. The configuration manager 426 also parses the assigned device configuration to determine one or more alarms to be applied based on the alarm profile of the assigned device configuration, and passes the alarms to the alarm manager 428.

Referring to FIG. 8, in one example the device configuration may specify that the asset being tracked is a refrigerated container 123-101 in which the mobile transceiver 102 may be required to check the temperature sensor 132 more often and at different triggers than a non-refrigerated container. The asset tracking service 200 may transmit the refrigerated container alarm profile via the cellular network 160 to the mobile transceiver 102 mounted to the container 123-101. The refrigerate container alarm profile may contain instructions to send updates if the temperature increases above a certain value, for example 32° F., and/or if the door is opened. Updates may not be sent otherwise. An example alarm profile for a refrigerated asset is as presented in the table below.

| Alarm Number | Alarm Type | Trigger Condition Parameters | Action(s) when condition met |
|---|---|---|---|
| 1 | Date | Wake up at 12:00 PM daily | Report all sensors |
| 2 | Time | Wake up every 2 hours | Report all sensors and geolocation |
| 3 | Temperature above level | Check if temperature increases above 32° F. | Report all temperature sensors and geolocation |
| 4 | Door Opened | Check if door was opened | Report all sensors and geolocation |

Referring again to FIG. 8, the contents of the cargo container 123-104 may have a high value and a high value alarm profile may be applied in which more frequent updates are sent to the asset tracking service 200 at the expense of decreased battery life of the mobile transceiver 102. An example of an alarm profile for a high value asset is presented in the table below.

| Alarm Number | Alarm Type | Trigger Condition Parameters | Action(s) when condition met |
|---|---|---|---|
| 1 | Time | Wake up every 15 minutes | Read all sensors and send to server. Get geolocation and send to server. |
| 2 | Door Opened | Check if door was opened | Read all sensors and send to server. Get geolocation and send to server. |
| 3 | Door Closed | Check if door was closed | Read all sensors and send to server. Get geolocation and send to server. |
| 4 | Contents | Check if contents change | Read all sensors and send to server. Get geolocation and send to server. |
| 5 | Movement | Check if there is no movement for 5 minutes | Read all sensors and send to server. Get geolocation and send to server. |
| 6 | Movement | Check if there is movement after stop | Read all sensors and send to server. Get geolocation and send to server. |
| 7 | Geofence | Check if device enters defined geofence | Read all sensors and send to server. Get geolocation and send to server. |
| 8 | Geofence | Check if device exits defined geofence | Get location and send to server. |

In yet another example, the alarm profile may comprise the alarms presented in the table below. The alarms in this example also comprise information regarding the frequency/count of the alarm type, whether the alarm is enabled or disabled, and whether the particular alarm may enable another alarm (or itself).

| No. | Alarm Type | Trigger condition parameters | Frequency/ Count | Enabled | Action(s) when condition met | Enable/ Disable |
|---|---|---|---|---|---|---|
| 1 | Time | Wake up every 5 hours | Forever | Yes | Read all sensors and send to server. Get location and send to server. | None |
| 2 | Date | Wake up at 12:00 PM | Forever | Yes | Read all sensors and send to server. Get location and send to server. Run diagnostics | None |

-continued

| No. | Alarm Type | Trigger condition parameters | Frequency/ Count | Enabled | Action(s) when condition met | Enable/ Disable |
|---|---|---|---|---|---|---|
| | | | | | and report results to server. | |
| 3 | Temperature | Wakeup if temperature increases above 100° F. | Once | Yes | Read all sensors and send to server. Get location and send to server. | Enable Alarm 4 |
| 4 | Temperature | Wakeup if temperature decreases below 32° F. | Once | No | Read temperature sensor and send to server. | Enable Alarm 3 |
| 6 | Humidity | Wakeup if humidity increases above 90% | Once | Yes | Read humidity and temperature sensors and send to server. | None |
| 7 | Movement | Wakeup if there is no movement for 10 minutes | Forever | Yes | Get location and send to server. | None |
| 8 | Movement | Wake up if movement greater than 1 mile | Forever | Yes | Get location and send to server if change greater than 5 miles. | None |
| 9 | Door Open | Wakeup if door was opened | Once | Yes | Read all sensors and send to server. Get location and send to server. | Enable Alarm 10 |
| 10 | Door Close | Wakeup if door was closed | Once | No | Read all sensors and send to server. Get location and send to server. | Enable Alarm 9 |
| 11 | In Geofence | Wakeup if within defined geofence | Once | Yes | Read all sensors and send to server. | None |

FIG. 9B shows an example flowchart of a method 920 of setting an assigned device configuration for a mobile transceiver 102 in accordance with another example embodiment of the present disclosure. The method 920 differs from the method 900 in that it occurs after the mobile transceiver 102 has connected to the asset tracking service 200 for the first time. At 922, the asset tracking service 200 determines whether a new device configuration has been assigned to the mobile transceiver. If a new device configuration has been assigned to the mobile transceiver, at 924 it is downloaded, processed and the alarm profile specified by the new device configuration is set as the active alarm profile, and the active alarm profile is applied at 926. If a new device configuration has not been assigned to the mobile transceiver, at 926 the active alarm profile is applied.

Examples of Alarm Profiles

The alarm manager 428 sets alarms based on the active alarm profile and when alarms are triggered, processes the alarms, generates a device event, and sends the device event to the container manager 424 for processing. Each alarm profile defines one or more number of alarms. As described above, each of the alarms are defined by a trigger type, a trigger condition to be satisfied for the alarm to be triggered, and one or more actions to take when the alarm is triggered. As noted above, the alarm types may be date-based, time-based, sensor-based, location-based (geofence) or a combination thereof. An example alarm profile is presented in the table below.

| Alarm # | Type | Trigger Condition Parameters | Action(s) |
|---|---|---|---|
| 1 | Time | Wake up every 15 minutes | Read all sensors and send to server. Get location and send to server. |
| 2 | Movement | Check if there is no movement for 5 minutes | Get location and send to server. |
| 3 | Movement | Check if there is movement after stop | Get location and send to server. |
| 4 | Door Opened | Check if door was opened | Read all sensors and send to server. Get location and send to server. |
| 5 | Door Closed | Check if door was closed | Read all sensors and send to server. Get location and send to server. |
| 6 | Geofence | Check if device enters defined geofence | Read all sensors and send to server. |
| 7 | Geofence | Check if device exits defined geofence | Get location and send to server. |

There are two sub-types of date-based and time-based alarms. The first type is frequency-based which specifies a frequency at which data is to be measured. An example value for a time-based frequency alarm is every 15 minutes. The second type is fixed and specifies a time and/or date at which the condition parameters for the alarm are checked. An example value for the frequency alarm is 12:00 PM every day.

The sensor-based alarms are defined based on the capabilities of the mobile transceiver 102, e.g. the onboard sensors 130. The sensor-based alarms may include temperature, humidity, pressure, movement detection, location, location within or with respect to a specific geofence, door open or closed condition, etc. A geofence is a virtual perimeter defined by a particular geographic area using geo-spatial coordinates, such as Latitude and Longitude, used by the satellite receiver 120. A geofence may be fixed or dynamically generated, for example, a radius around a particular point location. The geofence may be a predefined set of boundaries, or may be a set of zones or areas which need not be adjacent.

The location-based alarms (or geofence alarms) are based on the location of the mobile transceiver 102 determined by the satellite transceiver 120.

An alarm may be a one-time alarm, a countdown alarm, or a recurring ("forever") alarm. One-time alarms and countdown type alarms are disabled once the alarm happens or the countdown timer reaches zero. A disabled alarm may be enabled by other alarms.

A non-exhaustive list of alarm types is provided in the table below.

| Alarm Type | Example | Notes |
|---|---|---|
| Time interval | Wake up at a given time interval. For example, every hour. May include an initial countdown number. | Specified in minutes. If a countdown number is specified, it is decremented every time this alarm is triggered. When it reaches zero, the alarm is disabled in volatile memory. If the device re-starts or a device configuration is reloaded from the asset tracking service the counter is reset. |
| Time of Day | Wake up at a given time of day. For example, at 12:00 PM. | Specified in 24 hr time hh:mm:ss format and UTC time. Can be specified as number of seconds since day start, UTC time. |
| Calendar Time | Wake up at a specific date and time. For example, at 12:00 PM on May 5, 2015. | Specified in time hh:mm:ss format and dd:mm:yyyy date format and UTC time. Can be specified as number of seconds in UTC time. |
| Door opens | Wake up if door is opened. | Detection of a door open event may involve one or more sensors. Triggered when the door is opened and it was previously closed. If the door remains open there are no additional triggers. |
| Door closes | Wake up if door is closed. | Detection of a door close event may involve one or more sensors. Triggered when the door is closed and it was previously open. If the door remains closed there are no additional triggers. |
| Door opens and in geolocation | Wake up if door is opened and device is not within a geolocation | Check current location before alarm action is executed. |
| Significant movement detected | Wake up if there is a movement for more than the listed number of minutes. | Time in minutes. If this alarm is triggered, the movement timer for this alarm is reset and the next alarm may happen only after listed number of minutes occurs again. |
| No movement detected (stop) | Wake up if there is a no movement for more than the listed number of minutes. | Time in minutes. If this alarm is triggered, the stop timer for this alarm is reset and the next alarm may happen only after listed number of minutes occurs again. |
| Tilt detected | Wake up if there is tilt movement above a hardcoded threshold. | Triggered when the tilt is detected. If tilted state remains, there are no additional triggers. |
| Temperature above value | The temperature is above a given value. | In degrees Celsius. Triggered when temperature increases above listed value. If temperature remains above trigger, there are no additional alarms. |
| Temperature below value | The temperature is below a given value. | In degrees Celsius. Triggered when temperature decreases below listed value. If temperature remains below trigger, there are no additional alarms. |
| Humidity above value | The humidity is above a given percentage value. | In percentage value. Triggered when the humidity increases above listed value. If humidity remains above trigger, there are no additional alarms. |
| Humidity below value | The humidity is below a given percentage value. | In percentage value. Triggered when the humidity decreases below listed value. If humidity remains below trigger, there are no additional alarms. |
| Light level above value | The light level is above a given value. | In lumens value. Triggered when the light level increases above listed value. If he light level remains above trigger, there are no additional alarms. |
| Light level below value | The light level is below a given value. | In lumens value. Triggered when the light level decreases below listed value. |

| Alarm Type | Example | Notes |
|---|---|---|
| | | If he light level remains below trigger, there are no additional alarms. |
| Pressure above value | The pressure is above a given value. | In kPa units. Triggered only when pressure increases above listed value. If he pressure remains above trigger, there are no additional alarms. |
| Pressure below value | The pressure level is below a given value. | In kPa units. Triggered only when pressure decreases below listed value. If he pressure remains below trigger, there are no additional alarms. |
| Container Vacant | Detected that container is vacant (empty). | Condition is either occupied or vacant, nothing in between. Triggered only when change from occupied to vacant. If container remains vacant, there are no additional alarms. Uses ToF sensor. |
| Container Occupied | Detected that container is occupied (full). | Condition is either occupied or vacant, nothing in between. Triggered only when change from vacant to occupied. If container remains occupied, there are no additional alarms. Uses ToF sensor. |
| Battery charge below percentage | The battery charge percentage is below a given value | Battery charge value in percentage. Triggered when the battery charge percentage decreases below listed value. If charge percentage remains below trigger, there are no additional alarms. |
| Enter geofence | Detect if geofence was entered. | Specified as geofence name listed in geofence section of the configuration. Triggered only when geofence is entered. No additional alarms are triggered while inside the geofence. |
| Exit geofence | Detect if geofence was exited. | Specified as geofence name listed in geofence section of the configuration. Triggered only when geofence is exited. No additional alarms are triggered while outside the geofence. |
| Door opens and in geofence | Wake up if door is opened and device is inside a given geofence. | Must check if device is inside geofence before the alarm action is executed. If inside geofence treated as a door open alarm. Otherwise, the alarm is ignored. |
| Door opens and not in geofence | Wake up if door is opened and device is outside a given geofence | Must check if device is outside geofence before the alarm action is executed. If outside geofence treated as a door open alarm. Otherwise, the alarm is ignored. |

Alarm actions are actions to be performed when an alarm has been triggered. Alarm actions typically comprise gathering data and/or sending the data to the asset tracking service 200. The alarm actions typically specify the type of data to gather and/or the data to transmit to the asset tracking service 200 but may include other actions such as running diagnostics, changing the operating state of the mobile transceiver 102 or enabling or disabling an alarm in an alarm profile, etc. A non-exhaustive list of alarm actions is provided in the table below.

| Alarm Action | Description |
|---|---|
| All sensors and geolocation | Read all sensors and get geolocation and report values. |
| Geolocation | Read GNSS location and report coordinates. |
| Temperature | Read Temperature sensor and report temperature. |
| Humidity | Read Humidity sensor and report humidity. |
| Altimeter | Read Altimeter sensor and report altimeter value. |
| Pressure | Read Pressure sensor and report value. |
| Tilt | Read tilt sensor and report tilt state, which may be tilted or not tilted. |
| Movement | Get movement delta value in minutes. |
| Capacity | Read capacity. Either vacant or occupied. |

-continued

| Alarm Action | Description |
|---|---|
| Container contents | Read time of flight sensor and report container contents status. Could be empty, full, half-full, etc. |
| Door status | Get door state. Either open or closed. |
| Geolocation | Read GNSS location and report geolocation coordinates. |
| None | No action taken. |
| In geofence | Read GNSS location and determine if device is within any of the configured geofences. |

If the geolocation is an alarm action, but the geolocation is not obtained after a timeout period, the location is sent to the asset tracking service 200 with a value of "not available" to indicate to the asset tracking service 200 that it could not be obtained.

Application of Alarm Profiles

Figures 10, 11:
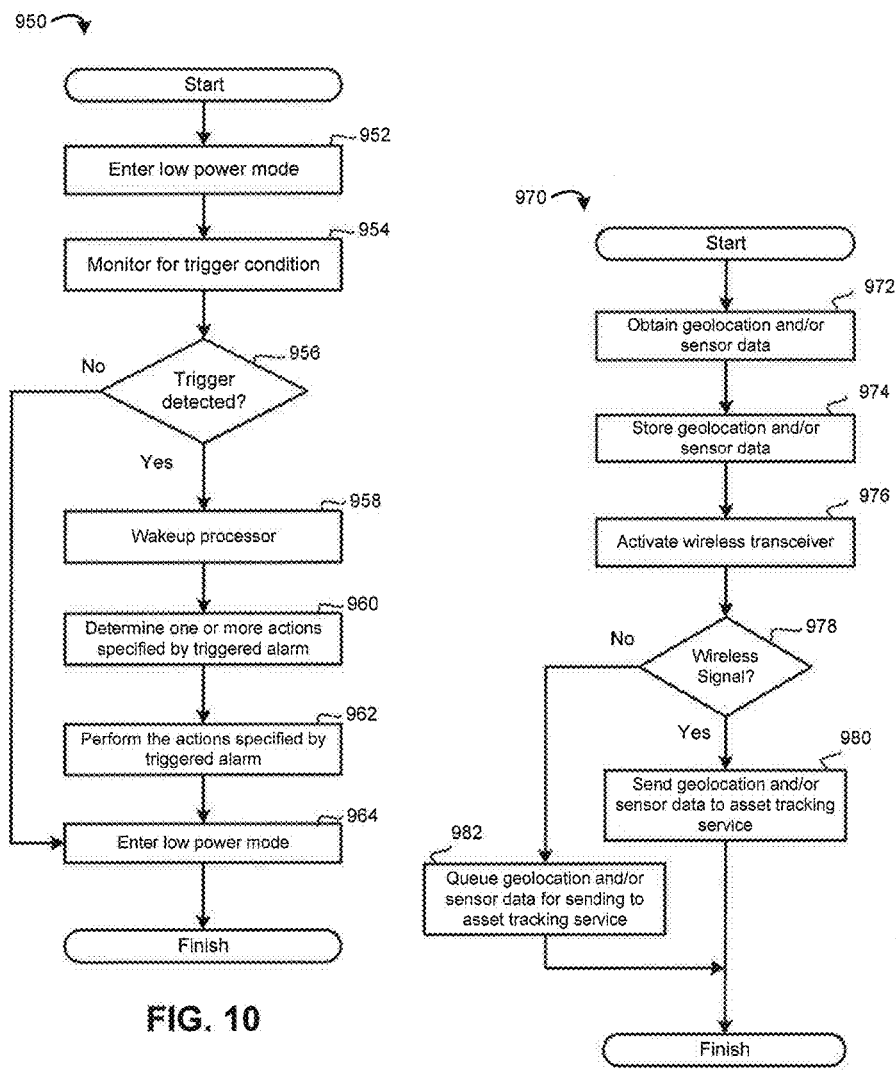
FIGS. 10 and 11 are flowcharts illustrating methods of operating a mobile transceiver in accordance with example embodiments of the present disclosure.

FIGS. 10 and 11 illustrate example methods 950, 970 of operating a mobile transceiver 102 such as a GNSS tracking device in accordance with one example embodiment of the present disclosure. The method may be carried out by software executed by a processor 104 of the mobile transceiver 102. Coding of software for carrying out such methods is within the scope of a person of ordinary skill in the art provided the present disclosure. The methods may contain additional or fewer processes than shown and/or described, and may be performed in a different order in other embodiments. Machine readable code executable by the processor to perform the methods may be stored in a machine readable medium such as a memory of the mobile transceiver 102.

Referring first to FIG. 10, at 952, the mobile transceiver 102 enters a low power mode, such as a sleep mode. The mobile transceiver 102 is in a sleep mode much of the time to conserve power and wakes up in response to alarms.

At 954, the mobile transceiver 102 monitors for one or more trigger conditions for one or more alarms in the active alarm profile while in a low power mode, such as a sleep mode. At 956, the mobile transceiver 102 determines whether a trigger condition has occurred. When interrupts are used, this step may be omitted. As noted above, the RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

When a trigger condition is detected, at 958 the processor 104 wakes up after a period of inactivity in response to the alarm. The processor 104 typically wakes up from a sleep mode in which the processor 104 and one or both of the cellular transceiver 114 or satellite receiver 120 were in a low power mode. Typically, the cellular transceiver 114 or satellite receiver 120 are slept at 958 until the processor 104 determines that the cellular transceiver 114 or satellite receiver 120 are to be used.

At 960, the mobile transceiver 102 determines one or more actions to be performed in response to the alarm. The actions may include one or more of obtaining data from the satellite receiver 120 and/or one or more sensors 130, reporting obtained data to the asset tracking service 200, or enabling/disabling one or more other alarms in the active alarm profile.

At 962, the determined actions are performed. Referring to FIG. 11, the processing of alarm actions in accordance with one example embodiment of the present disclosure will be described. At 972, when the actions specified by the alarm(s) which triggered the wakeup includes measure data using the satellite receiver 120 and/or sensors 130, the mobile transceiver 102 performs the data logging (acquisition) specified by the alarm.

Data logging may comprise determining its location and/or sensing its environment using the sensors 130. As a preliminary step, when the geolocation is to be obtained, the satellite receiver 120 is activated from a low power mode, which may be performed by the main processor 104 or the baseband processor 304, depending on the embodiment. Similarly, any sensors 130 to be used which were in a low power mode are activated.

At 974, the obtained geolocation and/or sensor data is stored in memory 112, in the asset tracking log, typically in association with a time at which the data was obtained.

At 976, when the action in response to the alarm which triggered the wake up in 702 includes reported data to the asset tracking service 200, the mobile transceiver 102 wakes up the wireless transceiver to be used, for example, the cellular transceiver 113. As a preliminary step, the wireless transceiver, e.g. cellular transceiver 114, is activated from a low power mode, which may be performed by the main processor 104 or the baseband processor At 978, the mobile transceiver 102 determines whether a wireless signal for the cellular transceiver 114 is available. When a wireless signal is available, processing proceeds to 980 at which the mobile transceiver 102 selects and accesses, or connects to, the wireless service, and sends the obtained geolocation and/or sensor data to the asset tracking service 200 using the wireless service.

At 982, when a wireless signal is not available, the obtained geolocation and/or sensor data is queued to send to the asset tracking service 200 the next time it connects, whether wirelessly by the wireless transceiver or wired by connection to a computing device 240.

Returning again to FIG. 10, at 964, after the mobile transceiver 102 has performed the actions specified by the triggered alarm, the mobile transceiver 102 enters a low power mode (e.g., sleep mode) in which the processor 104, cellular transceiver 114, satellite receiver 120 and possibly one or more sensors 130 are slept.

While the sending of obtained geolocation and/or sensor data is described, it will be appreciated that the full asset tracking log or portions thereof may be sent, not just the geolocation and/or sensor data that was obtained in 962.

The methods 900, 920, 950 and 970, 990 and 995 may be combined. For example, the mobile transceiver 102 may receive a new device configuration and new alarm profile any time it connects to the asset tracking service 200.

Figure 12A:
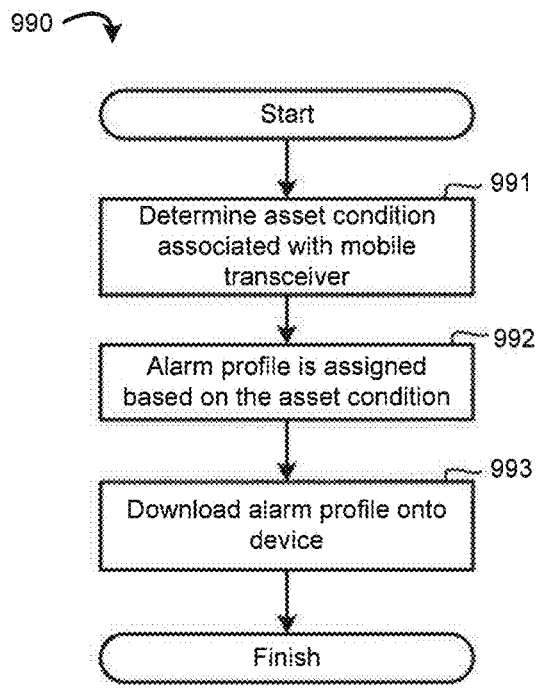
FIGS. 12A and 12B are flowcharts illustrating methods of configuring a mobile transceiver in accordance with example embodiments of the present disclosure.

FIG. 12A shows an example flowchart of a method 990 of configuring a mobile transceiver 102 such as a GNSS tracking device in accordance with one example embodiment of the present disclosure. The method may be carried out by software executed by a processor of the mobile transceiver 102. Coding of software for carrying out such a method 990 is within the scope of a person of ordinary skill in the art provided the present disclosure. The method 990 may contain additional or fewer processes than shown and/or described, and may be performed in a different order in other embodiments. Machine readable code executable by the processor to perform the method 990 may be stored in a machine readable medium such as a memory of the mobile transceiver 102.

At 991, an asset condition of the asset to which the mobile transceiver 102 is attached is determined based on the device ID of the mobile transceiver 102.

At 992, an alarm profile comprising one or more alarms is assigned to the mobile transceiver 102 based on the determined asset condition at the asset tracking server, for example, based on user input via the web-based portal. The assigned alarm profile is stored in memory of the asset tracking server, such as in the asset database, in association with the device ID of a respective mobile transceiver 102.

At 993, a device configuration file containing the assigned alarm profile is downloaded onto the mobile transceiver 102 when the mobile transceiver 102 next connects to the asset tracking service 200. Example methods of setting an assigned device configuration containing an assigned alarm profile in which the assigned alarm profile is downloaded onto the mobile transceiver 102 are provided above.

Figure 12B:
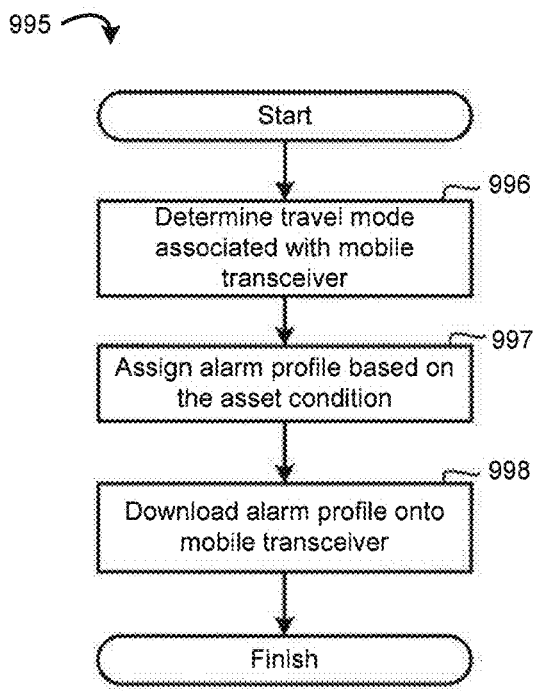

FIG. 12B shows an example flowchart of a method 995 of configuring a mobile transceiver 102 such as a GNSS tracking device in accordance with another example embodiment of the present disclosure.

At 996, a travel mode associated with the mobile transceiver 102 is determined based on the device ID of the mobile transceiver 102.

At 997, an alarm profile comprising one or more alarms is assigned to the mobile transceiver 102 based on the determined travel mode at the asset tracking server, for example, based on user input via the web-based portal. The assigned alarm profile is stored in memory of the asset tracking server, such as in the asset database, in association with the device ID of a respective mobile transceiver 102.

At 998, a device configuration file containing the assigned alarm profile is downloaded onto the mobile transceiver 102 when the mobile transceiver 102 next connects to the asset tracking service 200. Example methods of setting an assigned device configuration containing an assigned alarm profile in which the assigned alarm profile is downloaded onto the mobile transceiver 102 are provided above.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, comprising:
   wirelessly sending by a wireless transceiver of the mobile transceiver to a remote server of an asset tracking service a message including a device identifier (ID) of the mobile transceiver;
   wirelessly receiving by the wireless transceiver of the mobile transceiver from the remote server of the asset tracking service an alarm profile assigned to the device ID of the mobile transceiver in response to the message, wherein the alarm profile is determined by the remote server of the asset tracking service based on an asset condition associated with the mobile transceiver, wherein the asset condition is one of a route, location, sensor data, time, alarm status, asset type, asset contents, asset value or driver profile, wherein asset condition is dependent on one or more of the device ID of the mobile transceiver and a container ID of an asset to which the mobile transceiver is attached, wherein the alarm profile defines a plurality of alarms, each alarm including a trigger condition and one or more actions to be taken by the mobile transceiver in response to detection of the trigger condition, wherein the one or more actions comprise acquiring sensor data, reporting sensor data to the asset tracking service or a combination thereof;
   storing by a processor of the mobile transceiver the alarm profile in a memory of the mobile transceiver; and
   applying by the processor of the mobile transceiver the alarm profile to configure the operation of the mobile transceiver.

2. The method of claim 1, wherein each of the alarms is date-based, time-based, sensor-based, location-based or a combination thereof.

3. The method of claim 1, wherein the alarm profile is associated with an asset condition, wherein the asset condition is one of refrigerated container, non-refrigerated container, high value container or low value container.

4. The method of claim 1, wherein applying the alarm profile comprises:
   monitoring for one or more trigger conditions of the plurality of alarms in the alarm profile;
   waking up a processor from a low power mode in response to detecting one of the trigger conditions;
   identifying an alarm which was triggered based on the detected trigger condition by comparing the detected trigger condition to the alarms defined in the alarm profile;
   determining one or more actions to be performed based on the identified alarm; and
   performing the determined one or more actions associated with the identified alarm.

5. The method of claim 4, further comprising:
   before monitoring, initiating a low power mode for a main processor and wireless transceiver of the mobile transceiver.

6. The method of claim 4, wherein performing the determined one or more actions associated with the identified alarm comprises:
   activating a satellite receiver from a low power mode;
   determining a geolocation using the satellite receiver; and
   storing the geolocation in the memory of the mobile transceiver.

7. The method of claim 6, wherein performing the determined one or more actions associated with the identified alarm comprises:
   activating the wireless receiver from the low power mode;
   connecting to the asset tracking service via the wireless transceiver; and
   sending the geolocation to the asset tracking service.

8. The method of claim 4, wherein performing the determined one or more actions associated with the identified alarm comprises:
   enabling or disabling one or more of the alarms on the alarm profile.

9. The method of claim 1, wherein performing the determined one or more actions associated with the identified alarm comprises:
   acquiring sensor data using one or more sensors; and
   storing the sensor data in the memory of the mobile transceiver.

10. The method of claim 9, wherein performing the determined one or more actions associated with the identified alarm comprises:
    activating the wireless receiver from the low power mode;
    connecting to the asset tracking service via the wireless transceiver;
    sending the sensor data to the asset tracking service.

11. The method of claim 9, further comprising:
    before acquiring sensor data, activating at least some of the one or more sensors from a low power mode.

12. The method of claim 9, wherein the one or more sensors comprise a light sensor, the method further comprising:
    measuring an amount of light using the light sensor;
    determining a door status as open when the measured amount of light is greater than or equal to a threshold;
    determining a door status as closed when the measured amount of light is less than the threshold.

13. The method of claim 9, wherein the one or more sensors comprise a time-of-flight sensor, the method further comprising:
    measuring a travel time using the time-of-flight sensor;
    determining a door status as open when the measured travel time is greater than or equal to a threshold, wherein the threshold is set by a container profile based on dimensions of a container to which the mobile transceiver is attached;
    determining a door status as closed when the measured travel time is less than the threshold.

14. The method of claim 9, wherein the one or more sensors comprise a time-of-flight sensor, the method further comprising:
    measuring a travel time using the time-of-flight sensor;
    determining a content status as empty when the measured travel time is greater than or equal to a threshold, wherein the first threshold based on dimensions of a container to which the mobile transceiver is attached, the dimensions being specified by a container profile stored in the memory of the mobile transceiver;
    determining a content status as full when the measured travel time is less than the threshold.

15. The method of claim 9, further comprising:
    measuring a travel time using the time-of-flight sensor;
    determining a content status as empty when the measured travel time is greater than or equal to a first threshold, wherein the first threshold based on dimensions of a container to which the mobile transceiver is attached, the dimensions being specified by a container profile stored in the memory of the mobile transceiver;
    determining a content status as half-full or half-empty when the measured travel time is less than the first threshold but greater than or equal to a second threshold, the second throe being lower than the first threshold, wherein the second threshold based on dimensions of a container to which the mobile transceiver is attached, the dimensions being specified by a container profile stored in the memory of the mobile transceiver;
    determining a content status as fall when the measured travel time is less than the second threshold.

16. The method of claim 9, wherein the one or more sensors comprise an accelerometer, the method further comprising:
    measuring an amount of motion using the accelerometer;
    determining a door status as open when the measured amount of motion is greater than or equal to a threshold and a previously determined door status parameter stored in the memory of the mobile transceiver indicates that the door status is closed;
    determining a door status as closed when the measured amount of motion is less than the threshold and a previously determined door status parameter stored in the memory of the mobile transceiver indicates that the door status is open.

17. The method of claim 1, wherein the asset type specifies a cargo type or vehicle type.

18. The method of claim 17, wherein the asset type is one of oil truck, milk truck, service truck, freight truck, taxi/limo, rental car, intermodal container, crate, tank container, gas tank, insulated shipping container, flexible intermediate bulk container, or intermediate bulk container.

19. The method of claim 1, wherein the asset condition specifies an asset content, wherein the asset content is one of refrigerated, non-refrigerated, perishable, dry good cargo, farm produce, construction materials, logging goods, oil, weapons, aviation contents, flammable liquids, liquid hydrogen or other super cooled liquids, poisonous materials/liquids, radioactive materials, explosive, radioactive, confidential documents, poisonous, flammable, perishable, dry goods, or logs/woods.

20. The method of claim 1, wherein the asset condition specifies an asset value, wherein the asset value is one of high value or low value.

21. The method of claim 1, wherein the asset condition specifies a driver profile, wherein the driver profile specifies a driver rating.

22. The method of claim 1, wherein the asset condition specifies a travel mode describing a mode of transportation being taken.

23. A mobile transceiver, comprising:
    a processor;
    a satellite receiver coupled to the processor; and
    a wireless transceiver coupled to the processor;
    a memory coupled to the processor, the memory storing executable instructions that, when executed by the processor, cause the mobile transceiver to:
        wirelessly send by a wireless transceiver of the mobile transceiver to a remote server of an asset tracking service a message including a device identifier (ID) of the mobile transceiver;
        wirelessly receive by the wireless transceiver of the mobile transceiver from the remote server of the asset tracking service an alarm profile assigned to the device ID of the mobile transceiver in response to the message, wherein the alarm profile is determined by the remote server of the asset tracking service based on an asset condition associated with the mobile transceiver, wherein the asset condition is one of a route, location, sensor data, time, alarm status, asset type, asset contents, asset value or driver profile, wherein asset condition is dependent on one or more of the device ID of the mobile transceiver and a container ID of an asset to which the mobile transceiver is attached, wherein the alarm profile defines a plurality of alarms, each alarm including a trigger condition and one or more actions to be taken by the mobile transceiver in response to detection of the trigger condition, wherein the one or more actions comprise acquiring sensor data, reporting sensor data to the asset tracking service or a combination thereof;
        store by the processor of the mobile transceiver the alarm profile in the memory of the mobile transceiver; and
        apply by the processor of the mobile transceiver the alarm profile to configure the operation of the mobile transceiver.

24. A non-transitory machine readable medium having tangibly stored thereon executable instructions for execution by a processor of a mobile transceiver, the mobile transceiver comprising the non-transitory machine readable medium, a satellite receiver, and wireless transceiver each coupled to the processor, wherein the executable instructions, when executed by the processor, cause the mobile transceiver to:

wirelessly send by a wireless transceiver of the mobile transceiver to a remote server of an asset tracking service a message including a device identifier (ID) of the mobile transceiver;

wirelessly receive by the wireless transceiver of the mobile transceiver from the remote server of the asset tracking service an alarm profile assigned to the device ID of the mobile transceiver in response to the message, wherein the alarm profile is determined by the remote server of the asset tracking service based on an asset condition associated with the mobile transceiver, wherein the asset condition is one of a route, location, sensor data, time, alarm status, asset type, asset contents, asset value or driver profile, wherein asset condition is dependent on one or more of the device ID of the mobile transceiver and a container ID of an asset to which the mobile transceiver is attached, wherein the alarm profile defines a plurality of alarms, each alarm including a trigger condition and one or more actions to be taken by the mobile transceiver in response to detection of the trigger condition, wherein the one or more actions comprise acquiring sensor data, reporting sensor data to the asset tracking service or a combination thereof;

store by the processor of the mobile transceiver the alarm profile in the non-transitory machine readable medium of the mobile transceiver; and apply by the processor of the mobile transceiver the alarm profile to configure the operation of the mobile transceiver.

* * * * *